United States Patent
Arakawa et al.

(10) Patent No.: US 6,998,562 B2
(45) Date of Patent: Feb. 14, 2006

(54) CONTROLLER FOR A WIRE ELECTRICAL DISCHARGE MACHINE

(75) Inventors: Yasuo Arakawa, Yamanashi (JP); Toshiyuki Ogata, Yamanashi (JP); Kaoru Hiraga, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/141,471

(22) Filed: Jun. 1, 2005

(65) Prior Publication Data

US 2005/0269296 A1    Dec. 8, 2005

(30) Foreign Application Priority Data

Jun. 2, 2004    (JP) .............................. 2004/164828

(51) Int. Cl.
*B23H 1/00*  (2006.01)
*B23H 7/02*  (2006.01)
*B23H 7/20*  (2006.01)

(52) U.S. Cl. .................. 219/69.12; 219/69.16
(58) Field of Classification Search ............. 219/69.12, 219/69.16, 69.19; 700/162
See application file for complete search history.

(56) References Cited

U.S. PATENT DOCUMENTS

| 5,220,146 A | 6/1993 | Masicovetere et al. |
| 5,852,268 A * | 12/1998 | Buhler et al. ............ 219/69.12 |
| 6,278,075 B1 * | 8/2001 | Kamiguchi et al. ...... 219/69.12 |
| 6,723,941 B2 * | 4/2004 | Sato et al. ................ 219/69.12 |
| 2002/0128743 A1 * | 9/2002 | Kurihara et al. ............ 700/162 |

FOREIGN PATENT DOCUMENTS

| JP | 1-264718 | 10/1989 |
| JP | 4-201120 | 7/1992 |
| JP | 5-104330 | 4/1993 |
| JP | 5-111822 | 5/1993 |
| JP | 6-277949 | 10/1994 |
| JP | 7-266139 | 10/1995 |
| JP | 2002-254250 | 9/2002 |

\* cited by examiner

*Primary Examiner*—Geoffrey S. Evans
(74) *Attorney, Agent, or Firm*—Staas & Halsey LLP

(57) ABSTRACT

Set feed speed is lowered when a short circuit is detected in a range within which machining is unstable, the range starting from the point at which discharge is detected after machining starts from a machining start point, thus control is carried our according to a machining rate, thereby preventing successive occurrence of short circuits. When machining proceeds beyond the unstable range, the lowered feed speed is returned to the normal feed speed.

9 Claims, 9 Drawing Sheets

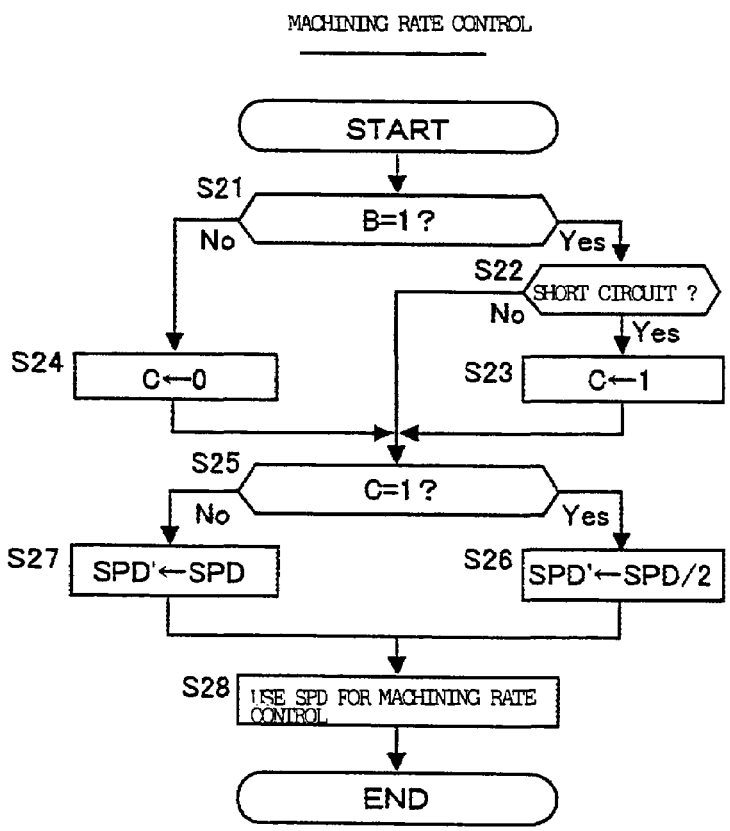
FIG. 5
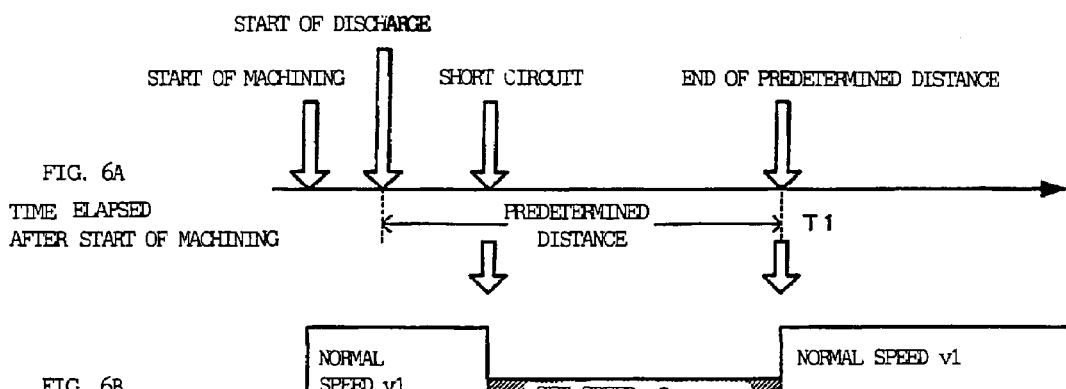
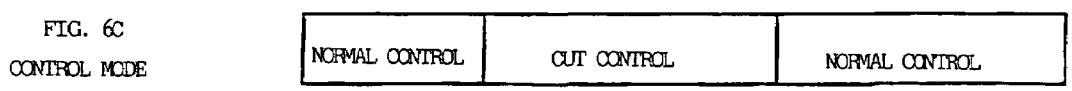

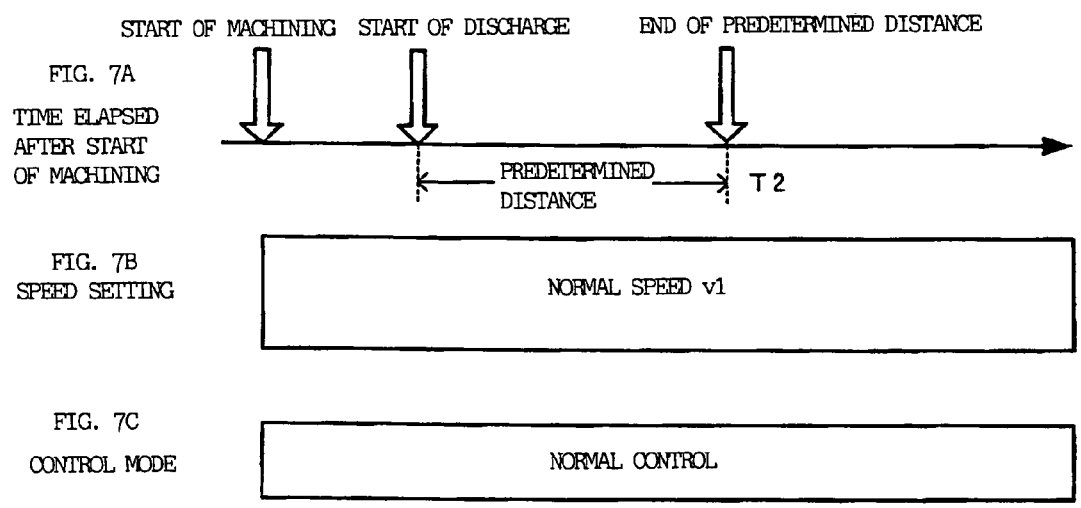

CONTROLLER FOR A WIRE ELECTRICAL DISCHARGE MACHINE

BACKGROUND OF THE INVENTION

1. Field of the Invention

The present invention relates to control of wire electrical discharge machines and, more particularly, to a controller and a control method by which increased machining efficiency is achieved.

2. Description of the Prior Art

In wire electrical discharge machining, corners and other parts of a workpiece at which a wire tends to break require additional corner control and other processing such as, for example, lowering feed speed and machining current in advance. To cope with this problem, a controller for a wire electrical discharge machine has been proposed that detects an electrical discharge machining rate and controls machining speed, machining energy and flow of machining fluid accordingly to the change in the electrical discharge machining rate to prevent wire breakage and increase the machining accuracy at corners (see patent document 1 below).

The above-described controller achieves stable machining in cutting from workpiece ends and from machining start holes.

To stabilize the machining process at the start of machining, technology for switching to machining conditions different from the normal conditions from the point where the machining starts until machining proceeds a fixed distance has also been proposed (see patent documents 2 to 6 below).

Of the above technologies, patent document 2 discloses control in which set feed speed at the start of machining is reduced to 70% of set feed speed under normal machining conditions and the quiescent time is extended to 180% of the quiescent time under the normal machining conditions, and normal machining conditions are resumed gradually in a series of steps while machining proceeds to a fixed distance from the machining start point. In another type of control, disclosed in patent document 3, a switchover to weakened machining conditions is made at the start of machining, and the pressure and machining fluid flow are measured, and normal machining conditions are resumed when the measurements return to appropriate values, or when machining proceeds to a fixed distance if the measurements do not return to the appropriate values. In another type of control, disclosed in patent document 4, the workpiece end including the start point is detected by detecting a voltage change, the on- and quiescent times over a fixed distance from that point are controlled, and the machining fluid is switched. In another type of control, disclosed in patent document 5, the machining conditions are switched over to weakened machining conditions for a fixed distance from the machining start point. In the control method disclosed in patent document 6, machining conditions weaker than normal machining conditions are set at the start of machining, and the machining conditions are changed to the normal machining conditions in a continuous manner as machining proceeds.

Patent document 7 discloses a method for preventing power supply burnout by switching over to conditions weaker than usual upon detection of a short circuit between the workpiece and the electrode, to avoid the risk of fire of or damage to devices due to repeated short circuits during machining, which lead to abnormally high temperature rises in the devices in the machining power supply, and after it is recognized that the machining process has stabilized, normal conditions are restored and machining is continued.

Patent document 1: Japanese Patent Application Laid-Open No. 2002-254250

Patent document 2: Japanese Patent Application Laid-Open No. H01-264718

Patent document 3: Japanese Patent Application Laid-Open No. H05-104330

Patent document 4: Japanese Patent Application Laid-Open No. H07-266139

Patent document 5: Japanese Patent Application Laid-Open No. H04-201120

Patent document 6: Japanese Patent Application Laid-Open No. H05-111822.

Patent document 7: Japanese Patent Application Laid-Open No. H06-277949

It has been confirmed that when the nozzle is in tight contact with a machining start hole and the hole diameter is smaller than the nozzle diameter, short circuits occur repeatedly near the hole and machining may become unstable. Possible causes of this problem are that if the nozzle covers the hole completely, it prevents proper discharging of the machining fluid ejected from the nozzle, so that metal particles and bubbles are not discharged away properly, and that turbulence of the machining fluid further amplifies wire vibration. This problem continues until the nozzle moves off the start hole so that the machining fluid can be adequately discharged.

When a technology such as that disclosed in patent documents 2 to 6 above is used to switch over to machining conditions different from normal conditions for a fixed distance from the machining start point as a means for preventing repetitive short circuits near the machining start hole, the time taken for machining is prolonged and machining efficiency is lowered.

In patent document 2, for example, performance is determined by a combination of the control distance and the initial levels of the speed and quiescent time, so these three factors need to be set individually and precisely to achieve high efficiency for various types of machining, requiring significant extra work. If large safety margins are added to these factors to eliminate the extra work, the machining efficiency is lowered. Furthermore, machining is always performed, under weakened conditions regardless of whether control dependent on the machining state is necessary, also lowering the machining efficiency.

In patent document 3, preparing cut-starting conditions for various types of machining requires extra work. If large margins are set to eliminate the extra work, the machining efficiency is lowered. Although the efficiency is increased by observing the machining fluid pressure and flow rate, this does not directly lead to stable machining. Machining still always starts under weakened conditions regardless of whether control is necessary, and the above problem remains.

A possible problem in patent document 4 is that control is not activated until a voltage change is detected during machining, without regard to the machining start point, as a result, the groove width may change during the machining process. Furthermore, because control is not activated until a voltage change is detected, machining is performed under intensive conditions in the normal state until the voltage change is detected. Considering the problems that occur at the machining start point and at the ends of workpieces, there is a risk that the wire may break immediately after a discharge, that is, before an abnormal discharge is detected due to a voltage change. Accordingly, conditions for stable machining need to be set in advance with regard to a machining start point and ends of workpieces to avoid wire breakage.

There is also a problem that preparation of conditions for stable machining involves extra work. Although enabling and disabling of this function is switched by a program command or on-screen setting, this still requires extra work by an operator. It is also difficult to correctly determine whether such control is necessary or not.

In patent document 5, extra work is necessary for preparing cut-starting conditions for various types of machining. If large safety margins are set in advance to eliminate an extra work, machining efficiency is lowered. Weakened machining conditions are always used for machining, regardless of whether such control is required or not, also resulting in poor machining efficiency.

Patent document 6 has the same problem as patent document 5, since extra work is necessary for preparing cut-starting conditions for various types of machining, and if large safety margins are set in advance to eliminate the extra work, then machining efficiency is lowered.

In patent document 7, the object is to prevent the power supply from being burnt out by repeated short circuits during continuous machining. If a short circuit is detected in the middle of machining, control is initiated even at a point other than the machining start point, as a result, a groove width may be changed during machining. Therefore, patent document 7 does not relate to a technology that solves the problem of repeatedly occurring short circuits at a machining start point.

If the technology disclosed in patent document 7 is applied at the machining start point, machining tends to destabilize for a certain distance from the ends of a workpiece or a machining start point, with the result that if conditions are restored normal because machining has once temporarily stabilized, then machining may destabilize again. Accordingly, the desired effects of the present invention cannot be expected. Another problem is that an extra work is necessary for preparation of stable conditions to cope with various types of machining.

Patent document 7 also has a problem similar to that in patent document 4. Initiation of control by detecting a short circuit means that machining is performed under intensive conditions in the normal state until a short circuit is detected. Considering problems occurring at the machining start point and the ends of the workpiece, wire may break immediately after a discharge, that is, before detecting an abnormal discharge due to short circuits. For this reason, conditions for stable machining need to be set in advance for a machining start point and ends of workpieces to prevent wire breakage.

As described above, the object of patent document 7 is to prevent the power supply from being burnt out, so that it is not reasonable to apply the technology disclosed in patent document 7 to machining start points.

Another problem is that extra works are necessary for preparation of stable conditions to cope with various types of machining.

As in the case of patent documents 2 to 6 above, which show carrying out machining at a machining start point, machining is always performed in an initial state, regardless of whether or not machining will be stable when started under normal conditions. Operations carried out from the machining start point in these control methods can generally be expected to produce results in high-speed machining and other types of machining that use energy and machining fluid under intensive conditions. However, when the usage of energy and machining fluid is not so intensive, as in the case of a primary machining in precision finish machining, stable machining is often realized even if such controls are not carried out. In such cases, these control methods work disadvantageously and lower the machining efficiency by requiring extra machining time.

FIGS. 9A and 9B illustrate how machining proceeds when no short circuit occurs within a predetermined distance from a machining start point. The "predetermined distance" is referred to as a range within which machining is initially unstable. In these figures, time required for machining to proceed the predetermined distance at a set normal feed speed v1 is T10.

FIGS. 10A and 10B illustrate how machining proceeds when short circuits occur within a predetermined distance from a machining start point. If a short circuit occurs between a wire electrode and workpiece, power supply is interrupted and discharge is restarted. Therefore, if short circuits occur repeatedly under a set normal feed speed v1, machining stops every time a short circuit occurs, with the result that the time T11 required for machining to proceed the predetermined distance becomes longer than the time T10 in FIG. 9A.

FIGS. 11A and 11B illustrate machining in which the speed setting is changed when machining proceeds to a predetermined distance from the machining start point. As described in the above patent documents, to suppress short circuits, a feed speed is set to v2, which is lower than the normal feed speed v1, until machining proceeds the predetermined distance from a machining start point. The feed speed v2 is lower than the normal feed speed v1, so the time T12 required for machining to proceed the predetermined distance is longer than the time T10 in FIG. 9A.

It is very difficult to determine whether or not such type of control is required for various types of machining, furthermore, in case where such control is required, it takes considerable time to prepare appropriate initial machining conditions. For saving time, it is necessary to set a large safety margins to cope with various types of machining, thereby lowering the machining efficiency.

SUMMARY OF THE INVENTION

According to the present invention, to suppress successive short circuits, a lower feed speed is set at a point at which a short circuit is detected in the range within which machining remains unstable, extending from the point at which discharge is detected, after machining starts from the machining start point, and control is performed according to a machining rate, and then the lowered set feed speed is restored to the set normal speed after the machining point proceeds beyond the unstable machining range.

In machining rate control, in which an electrical discharge machining rate is detected and machining speed, machining energy, machining fluid flow and so on are controlled according to changes in the machining rate, machining energy and machining fluid flow are held low, immediately after the start of machining where the machining rate is low, as compared with a machining state where machining energy and machining liquid rate are normal, so that there is little risk of wire breakage even if machining becomes unstable, with the result that short circuits can be detected reliably. Thus, machining speed can be lowered by lowering set feed speed, as a result, detected machining rate is further reduced, so that machining energy and machining fluid flow are also further lowered, and then machining proceeds in a stable manner.

If a short circuit does not occur in the range within which machining is unstable, machining is performed under normal feed control without reducing set feed speed.

Therefore, feed speed is switched to a low value only after a short circuit occurs in the range within which machining is unstable. Feed speed is not switched if a short circuit does not occur, and is not switched in a stable machining range, so the reduction in machining efficiency due to switchover of feed speed setting is suppressed, whereby machining can be performed efficiently.

An unstable machining range can be set to a distance approximately equal to the radius of a nozzle, extending from the point where discharge is detected. When machining proceeds a distance equal to the radius of the nozzle from the discharge start point, feed speed setting is restored to the previous value and then normal machining takes over. If a short circuit does not occur within the distance equal to the radius of the nozzle from the position where discharge is detected, the normal feed speed is used for machining.

The controller for a wire electrical discharge machine according to the present invention supplies discharge pulse current between a wire electrode and a workpiece to perform electrical discharge machining while causing relative motion between the wire electrode and the workpiece. As described above, the controller performs machining rate control. More specifically, the controller detects an electrical discharge machining rate and controls machining speed, machining energy, machining fluid flow, and other parameters according to changes in the detected machining rate.

A machining rate control of this type is performed by detecting an electrical discharge machining rate based on counted numbers of discharge pulses supplied (a first mode), or performed based on integrated values of discharge pulse current supplied (a second mode).

In the first mode, which performs machining rate control by detecting an electrical discharge machining rate based on counted numbers of discharge pulses supplied, the controller for a wire electrical discharge machine has, as an arrangement for performing machining rate control, discharge pulse counting means for counting the number of supplied discharge pulses every preset time, moving means for causing relative motion between the wire electrode and the workpiece along a machining path according to motion commands, reference discharge pulse count storage means for storing a reference number of discharge pulses per unit time, and discharge pulse count comparing means for comparing the value obtained from the discharge pulse counting means with the value obtained from the reference discharge pulse count storage means and for obtaining the ratio therebetween.

In addition to the above arrangement for performing machining rate control, the controller for a wire electrical discharge machine according to the present invention has, as an arrangement for switching speed settings by lowering the set feed speed upon detection of a short circuit while the machining point remains within a predetermined distance range from the point where discharge is detected and restoring the normal speed when the machining point proceeds beyond the predetermined distance range, discharge start point detecting means for detecting a discharge start point by detecting occurrence of discharge, machining travel distance calculating means for calculating a machining travel distance from the discharge start point, comparing means for comparing the machining travel distance with the predetermined distance, short circuit detecting means for detecting short circuits between the wire electrode and workpiece, and feed speed setting switching means for switching the set feed speed.

According to the comparison result obtained from the comparing means and to the detection output from the short circuit detecting means, the feed speed setting switching means switches to a low feed speed when a short circuit is detected while the machining travel distance is within the predetermined distance, and switches to the normal feed speed when the machining travel distance exceeds the predetermined distance.

In the second mode, which performs machining rate control based on integrated values of discharge pulse current supplied, the controller of a wire electrical discharge machine has, as an arrangement for performing machining rate control, discharge pulse current integrating means for integrating supplied discharge pulse current every preset time, moving means for causing relative motion between the wire electrode and the workpiece along a machining path according to commands, reference integrated discharge pulse current value storage means for storing a time-integrated value of a reference discharge pulse current, integrated discharge pulse current value comparing means for comparing the value obtained from the discharge pulse current integrating means with the value obtained from the reference integrated discharge pulse current value storage means and obtaining the ratio therebetween, and feed pulse calculating means for obtaining a distance by multiplying a relative movement of the wire electrode with respect to the workpiece, which is determined from a set feed speed and the preset time, by the ratio and for sending the obtained distance to the moving means as a movement command every preset time.

In addition to the above arrangement for performing machining rate control, the controller for a wire electrical discharge machine according to the present invention has, as an arrangement for switching set feed speed by lowering a set feed speed upon detection of a short circuit while the machining point remains within a predetermined distance range from the point where discharge is detected and restoring the normal feed speed when the machining point proceeds beyond the predetermined distance range, discharge start point detecting means for detecting a discharge start point by detecting an occurrence of discharge, machining travel distance calculating means for calculating a machining travel distance from the discharge start point, comparing means for comparing the machining travel distance with the predetermined distance, short circuit detecting means for detecting short circuits between the wire electrode and workpiece, and feed speed setting switching means for switching a set feed speed.

According to the comparison result obtained from the comparing means and to the detection output from the short circuit detecting means, the feed speed setting switching means switches to a low feed speed when a short circuit is detected while the machining travel distance is within the predetermined distance, and switches to the normal feed speed when the machining travel distance exceeds the predetermined distance.

In the first mode, which performs machining rate control by detecting an electrical discharge machining rate based on counted numbers of discharge pulses supplied, machining rate control can be applied to a discharge quiescent time and coolant flow.

A discharge quiescent time control means is provided as an arrangement for controlling the discharge quiescent time in the first mode. The discharge quiescent time control means controls discharge quiescent time according to the comparison result from the discharge pulse count comparing means so that the value that the discharge pulse counting means obtains every preset time matches the value stored in the reference discharge pulse count storage means. Alternatively, the discharge quiescent time control means may control the discharge quiescent time according to the comparison result from the discharge pulse count comparing means so as to restrain the supply of extra energy. Control of coolant flow can be performed according to the ratio obtained by the discharge pulse count comparing means.

In the second mode, which performs machining rate control based on integrated values of discharge pulse current supplied, machining rate control can also be applied to the discharge quiescent time and coolant flow.

A discharge quiescent time control means is provided as an arrangement for controlling discharge quiescent time in the second mode. The discharge quiescent time control means controls discharge quiescent time according to the comparison result from the integrated discharge pulse current value comparing means so as to restrain supplying of extra energy. Control of coolant flow can be performed according to the ratio obtained by the integrated discharge pulse current value comparing means.

According to the present invention, stable machining by a wire electrical discharge machine can be carried out at the start of machining, and furthermore, reduction in machining efficiency due to machining control can be decreased.

BRIEF DESCRIPTION OF THE DRAWINGS

The forgoing and other objects and feature of the invention will be apparent from the following description of preferred embodiments of the invention with reference to the accompanying drawings, in which:

FIG. 5 is a flowchart illustrating how the controller of the present invention controls the machining rate;

FIGS. 6A to 6C illustrate how the controller of the present invention lowers the feed speed when a short circuit occurs within a predetermined distance from a discharge start point;

FIGS. 7A to 7C illustrate operations carried out when a short circuit does not occur within the predetermined distance from the discharge start point;

DETAILED DESCRIPTION OF THE PREFERRED EMBODIMENTS

Figure 1A:
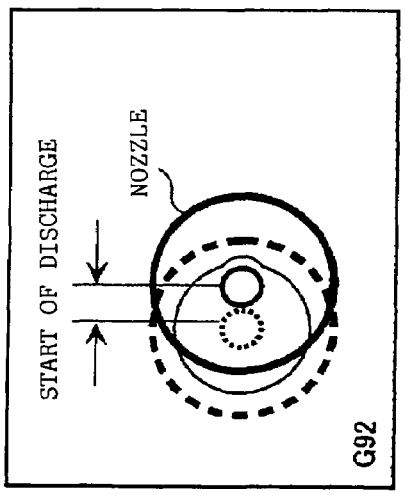
FIGS. 1A to 1C illustrate how the controller for a wire electrical discharge machine according to the present invention is used to suppress successive short circuits at the start of machining.

Embodiments of the present invention will be described below with reference to the drawings.

First, the machining rate control carried out in the controller for a wire electrical discharge machine according to the present invention will be described.

The relation between the machining energy supplied in electrical discharge machining and the amount of machining done is represented by the following equations. In the following equations, "t" is the thickness of the workpiece, Ps and Px are numbers of discharge pulses occurring per unit time T, "w" is the amount of machining per discharge pulse, $\Delta s$ is the distance traveled during the reference number Ps of discharge pulses (that is, the travel distance per unit time T), $\Delta x$ is the distance traveled during Px discharge pulses, and "g" is the width of the groove being cut.

$$Ps \times w = \Delta s \times t \times g$$

$$Px \times w = \Delta x \times t \times g \tag{1}$$

That is:

$$Ps/\Delta s = Px/\Delta x = t \times g/w \tag{2}$$

Incidentally, if "w" (the amount of machining per discharge pulse) is constant, Ps and Px (the number of discharge pulses occurring per unit time T) indicate values proportional to the amount of machining performed in the unit time T.

If the thickness "t" is constant and the width "g" of the machined groove is also constant, the following equation holds:

$$Ps/Px = \Delta s/\Delta x \tag{3}$$

In other words, equation (3) indicates that if feeding can be performed so that the change (Ps/Px) in the number of discharge pulses per unit time T equals the resulting change ($\Delta s/\Delta x$) in the distance fed, the width "g" of the machined groove will be constant.

The reference travel distance $\Delta s$ per unit time T is obtained from a reference feed speed SPD, as indicated by the following equation:

$$\Delta s = SPD \times T \tag{4}$$

The distance $\Delta x$ is obtained from equations (3) and (4), as indicated by the following equation:

$$\Delta x = SPD \times T \times (Px/Ps) \tag{5}$$

Equation (5) also indicates that the set feed speed is changed from SPD to (SPD×(Px/Ps)).

If the relation between the reference number Ps of discharge pulses per unit time T and the reference feed speed SPD is set in advance, the travel distance $\Delta x$ can be calculated by counting the number Px of discharge pulses per unit time T, which varies during the machining process. According to equation (1), the travel distance $\Delta x$ is represented as follows:

$$\Delta x = (Px \times w)/(t \times g)$$

(Px×w) in this equation is the amount of machining done when Px discharge pulses are generated. The travel distance $\Delta x$ is obtained by dividing the amount of machining (Px×w) by the product (t×g) of the thickness "t" of the workpiece and the width "g" of the machined groove. Therefore, moving the wire electrode by the distance $\Delta x$ amounts to moving the wire electrode by the amount of machining done by Px discharge pulses.

From equation (5), that is, the travel distance $\Delta x$ by the wire electrode corresponding to the amount of machining done by the discharge pulses is obtained from the reference number Ps of discharge pulses per unit time T and the number Px of discharge pulses counted per unit time T.

The relation between the travel distance $\Delta$ and the number P of discharge pulses per unit time T generally varies depending on the material and thickness "t" of the workpiece, the width "g" of the machined groove, and other parameters. If, for example, the thickness "t" of the workpiece and the groove width "g" are constant, the travel distance $\Delta$ and the number P of discharge pulses are mutually proportional. The coefficient of proportionality is equivalent to $(t \times g/w)$ in equation (2). If "t" and "g" are constant, the coefficient of proportionality depends on the reciprocal of "w", in equation (2). For example, super hard tungsten carbide has a coefficient of proportionality greater than that of die steel, indicating that the amount of machining performed on super hard tungsten carbide per discharge pulse is less than the amount performed on die steel. This agrees with the fact that the super hard tungsten carbide is harder to machine by electrical discharge machining than die steel is.

If the groove width "g" is constant and the thickness "t" is changed without changing the workpiece material, the travel distance $\Delta$ and the number P of discharge pulses per unit time T show a proportional relationship. In this case, "g" and "w" in equation (2) are constant, so the coefficient of proportionality depends on the thickness "t" of the workpiece.

If the width "g" of the machined groove is constant, then from equation (2), which represents the relation between the thickness "t" of the workpiece and the ratio $(P/\Delta)$ of the number P of discharge pulses to the travel distance $\Delta$, the following relation holds:

$$t=(w/g) \times (P/\Delta)$$

Therefore, the coefficient of proportionality between $(P/\Delta)$ and "t" is $(w/g)$. Since the groove width "g" is constant, the coefficient of proportionality depends on the amount of machining per discharge pulse. For example, the coefficient of proportionality of aluminum is large and that of superhard tungsten carbide is small, indicating that the amount "w" of machining performed on aluminum per discharge pulse is large and the amount performed on superhard tungsten carbide is small. This agrees with the general fact that the aluminum is easy to machine by electrical discharge machining and superhard tungsten carbide is hard to machine by electrical discharge machining.

As described above, the relation between the travel distance $\Delta$ and the number P of discharge pulses varies according to the material and thickness "t" of the workpiece, the width "g" of the machined groove, and other parameters. When the travel distance $\Delta x$ by the wire electrode is controlled according to equation (5), therefore, the relation between the reference number Ps of discharge pulses per unit time and the reference feed speed SPD ($=\Delta s/T$) needs to be determined in advance. More specifically, the relation between the number P/T ($=$Ps) of discharge pulses per unit time T and the distance $\Delta/T$ ($=\Delta s$) traveled per unit time T is determined for workpieces made of various materials, by varying the workpiece thickness and the wire electrode diameter (the width of the machined groove), to obtain the ratio of the number P of discharge pulses per unit time T to the travel distance $\Delta$.

$$\kappa=P/\Delta \qquad (6)$$

If the ratio $\kappa$ that has been obtained is multiplied by the set feed speed SPD, the reference number Ps ($=\kappa \times$SPD) of discharge pulses per unit time can be obtained.

At the start of electrical discharge machining, the ratio $\kappa$ is read out according to the material and thickness of the workpiece and the wire electrode diameter, which have been set as machining conditions, and the ratio $\kappa$ is multiplied by the set feed speed SPD to obtain the reference number Ps ($\kappa \times$SPD) of discharge pulses per unit time. While electrical discharge machining is in progress, the number Px of discharge pulses per unit time is detected and the travel distance by the wire electrode per unit time relative to the workpiece is controlled according to equation (5).

Thickness data to be set as a machining condition is not necessarily prepared. In this case, the ratio $\kappa$ corresponding to the set workpiece thickness can be obtained by a method such as proportional apportionment or an approximating curve.

Even when data on materials of workpiece to be actually machined by electrical discharge machining has not been prepared, the ratio $\kappa$ can also be set from the following considerations. As indicated by equation (6), a large ratio $\kappa$ indicates that a large number of discharge pulses are required to machine the same distance, which means the amount "w" of machining per discharge pulse is small.

Conversely, a small $\kappa$ indicates that a small number of discharge pulses are required to machine by the same distance, which means the amount "w" of machining per discharge pulse is large. Therefore, for materials that are considered amenable to electrical discharge machining, the ratio $\kappa$ is small, while, for materials that are considered resistant to electrical discharge machining, the ratio $\kappa$ is large.

Therefore, even when data on the material of the workpiece to be actually machined is not available, if the degree of difficulty in machining the material is known from previous experience or the like, a material with a comparable degree of machining difficulty may be found and set as the workpiece material. Alternatively, if machining difficulty of the workpiece to be actually machined by electrical discharge machining is known to be intermediate of machining difficulties of two materials of which ratios $\kappa$ are available, an intermediate value of $\kappa$ of those two materials may be set manually.

Next, control of quiescent time will be described.

The relation between the voltage and current applied across the workpiece and wire electrode is represented by the following equations. In these equations, Px and Px+1 are the numbers of pulses per unit time at respective positions $\Delta x$ and $\Delta x+1$, Vx and Vx+1 are respective average machining voltages, and Vp is no-load voltage, Ton is the current pulse width, Toff is the quiescent time, and Tw(x) and Tw(x+1) are respective average no-load times per unit time T. In addition, Ps, Vs, and Tw(s) are reference number of discharge pulses per unit time T, reference average machining voltage, and reference average no-load time, respectively.

$$Px=T/(Tw(x)+Ton+Toff)$$

$$Px+1=T/(Tw(x+1)+Ton+Toff)$$

$$Ps=T/(Tw(s)+Ton+Toff)$$

$$Vx=Vp \times Tw(x)/(Tw(x)+Ton+Toff)$$

$$Vx+1=Vp \times Tw(x+1)/(Tw(x+1)+Ton+Toff)$$

$$Vs=Vp \times Tw(s)/(Tw(s)+Ton+Toff)$$

Assuming that Ton<<Tw+Toff, the above equations can be simplified by replacing Tw+Ton+Toff with the effective quiescent time τ.

$$Tw(x)+Toff=\tau(x) \quad (7)$$

$$Tw(x+1)+Toff=\tau(x+1) \quad (8)$$

$$Tw(s)+Toff=\tau(s) \quad (9)$$

$$Px=T/\tau(x) \quad (10)$$

$$Px+1=T/\tau(x+1) \quad (11)$$

$$Ps=T/\tau(s) \quad (12)$$

$$Vx = Vp \times (\tau(x) - Toff)/\tau(x) \quad (13)$$
$$= Vp \times (1 - Toff)/\tau(x)$$

$$Vx+1 = Vp \times (\tau(x+1) - Toff)/\tau(x+1) \quad (14)$$
$$= Vp \times (1 - Toff)/\tau(x+1)$$

$$Vs = Vp \times (\tau(s) - Toff)/\tau(s) \quad (15)$$
$$= Vp \times (1 - Toff)/\tau(s))$$

Average machining currents Im(s), Im(x), and Im(x+1) per unit time T and average machining current densities Id(s) Id(x), Id(x+1) are obtained from the following equations. In these equations, "t" is the workpiece thickness and "g" is the width of the machined groove.

$$Im(s)=Ip \times Ton \times Ps \quad (16)$$

$$Id(s)=Im(s)/(t \times g) \quad (17)$$

$$Im(x)=Ip \times Ton \times Px \quad (18)$$

$$Id(x)=Im(x)/(t \times g) \quad (19)$$

$$Im(x+1)=Ip \times Ton \times Px+1 \quad (20)$$

$$Id(x+1)=Im(x+1)/(t \times g) \quad (21)$$

From equation (5) and the above equations, the following equations are obtained:

$$\Delta s/\Delta x=Ps/Px=Id(s)/Id(x) \quad (22)$$

$$\Delta s/\Delta x+1=Ps/Px+1=Id(s)/Id(x+1) \quad (23)$$

Equations (22) and (23) indicate that if machining feed is performed according to equation (5), the average machining current density per unit time T also increases or decreases.

This is explained in terms of changes in the average machining voltage Vm and the sludge density Sc in the electrode-workpiece gap during electrical discharge machining. When sludge density Sc begins to increase, average machining voltage Vm is thought to follow a curve as many fine discharge-triggering conductive paths through the sludge are detected.

Sludge density Sc, number P of discharge pulses per unit time and effective quiescent time τ are constantly changing during electrical discharge machining process. When sludge density Sc begins to increase, many fine conductive paths through the sludge, which trigger occurrence of discharge, are detected, and the number of discharge pulses supplied increases, tracing a curve that minimizes the effective quiescent time τ. As a result, the no-load time Tw is shortened, and a shift to intensive discharge occurs due to the special properties of discharge generation as described above, possibly causing wire breakage, poor surface roughness, and uneven groove widths.

In machining rate control, the above problem is settled by automatically changing quiescent time Toff so that number of discharge pulses does not increase beyond a limit.

In machining according to equation (5) above, the number P of discharge pulses per unit time T and the effective quiescent time τ change according to the machining rate and the sludge density Sc, as indicated by equations (11) and (12). Now if the reference number Ps of discharge pulses per unit time, by which an optimum discharge pulse density is obtained, and the effective quiescent time τ(s) at that time are set on a line. Considering quiescent time control to be carried out when number (Px+1) of discharge pulses which exceeds the reference number Ps of discharge pulses, to make the number Px+1 of discharge pulses at a point at which Px+1 exceeds Ps approach the reference number Ps of discharge pulses per unit time, it suffices to prolong the reference quiescent time Toff(s) by the difference between the effective quiescent time τ(x+1) and τ(s), that is, by the amount by which the no-load time Tw has been reduced.

If the quiescent time to be controlled is denoted Toff(x+1), the following equations hold:

$$\tau(s)-\tau(x+1)=Toff(x+1)-Toff(s) \quad (24)$$

$$Toff(x+1)=\tau(s)-\tau(x+1)+Toff(s) \quad (25)$$

From equations (11) and (12), the following equation holds:

$$Toff(x+1)=(1/Ps-1/Px+1) \times T+Toff(s) \quad (26)$$

That is, to control the quiescent time to match the point at which the optimum discharge pulse density is obtained, the difference between the reciprocal of the reference number Ps of discharge pulses at the optimum point and the reciprocal of the number Px+1 of discharge pulses at the point at which Px+1 exceeds Ps is obtained every unit time T, and the reference quiescent time Toff(s) is prolonged by the difference.

Next, quiescent time control when the number of discharge pulses Px falls below the reference number Ps of discharge pulses per unit time will be described. As in the above example, effective quiescent time τ, number P of discharge pulses and average machining voltage Vm vary according to equations (10), (12), (13), and (15). Since the machining rate at a point at which the number of discharge pulses falls below the reference number Ps is low, discharge pulses having a long effective quiescent time including a long no-load time Tw(x) will usually occur.

Due to the special properties of discharge generation described above, however, a succession of discharge pulses having a short no-load time Tw(x) through sludge may occur, which may causes wire breakage. An average machining voltage may often drop acutely and discharge pulses having a short no-load time Tw(x) may be supplied to an inter-electrode gap.

To prevent these short discharge pulses from being applied to the gap, therefore, it suffices to prolong the quiescent time in advance so that an effective quiescent time τ(x) does not drop below τ(s) even if an average machining voltage drops below the average machining voltage corresponding to the effective quiescent time τ(s) during machining.

If the average machining voltage corresponding to the effective quiescent time τ(x) is set equal to the average machining voltage corresponding to the effective quiescent time τ(s), then from equations (13) and (14), the following equations are obtained, in which Toff(x) is quiescent time to be controlled.

$$Vp \times (\tau(x)-Toff(x))/\tau(x) = Vp \times (\tau(s)-Toff(s))/\tau(s) \qquad (27)$$

$$Toff(x) = Toff(s) \times \tau(x)/\tau(s) \qquad (28)$$

The following equation is derived from equations (10) and (12):

$$Toff(x) = Toff(s) \times (Ps/Px) \qquad (29)$$

The above equation indicates that it suffices to change the quiescent time Toff(x) to a value obtained by multiplying the reference quiescent time Toff(s) by the reciprocal of the ratio of the number Px of discharge pulses to the reference number Ps of discharge pulses. The discharge quiescent time is thus controlled to restrain the supply of extra energy, according to evaluation functions based on equations (26) and (29).

When discharge quiescent time is controlled according to equations (26) and (29), the ratios κ determined in advance for various materials, workpiece thickness and wire electrode diameters can be used as described above. The reference number Ps of discharge pulses per unit time is obtained by multiplying the determined ratio κ by the set feed speed SPD (=κ×SPD) to perform calculations of equations (26) and (29).

At the start of machining and at corners of a workpiece, a wire electrode may be fed without machining. In this case, even if voltage is applied to the gap between the wire electrode and workpiece, discharge does not easily generate (no-load time Tw is large), so the number Px of discharge pulses is less than the reference number Ps of discharge pulses. Therefore, the quiescent time Toff(x) obtained from equation (29) becomes larger than the reference quiescent time Toff(s). During the quiescent time, however, the wire electrode moves relative to the workpiece, and the gap becomes narrow, as a result, no-load time Tw becomes short, and discharges occur early. As a result, the number Px of discharge pulses per unit time T increases. As the number Px of discharge pulses increases, the quiescent time Toff (x) obtained from equation (29) is reduced, so that Toff(x) approaches the reference quiescent time Toff(s).

When the number Px of discharge pulses exceeds the reference number Ps of discharge pulses, the quiescent time Toff(x+1) is calculated from equation (26). The quiescent time Toff(x+1) becomes longer than the reference quiescent time Toff (s). As the quiescent time Toff(x+1) increases, the number Px+1 of discharge pulses tends to decrease (assuming that the no-load time Tw is constant, the longer the quiescent time Toff(x+1) is, the smaller the number Px+1 of discharge pulses becomes). The quiescent time Toff(x) is thereby controlled so that the number Px of discharge pulses becomes equal to the reference number Ps of discharge pulses.

When the number of discharge pulses changes, the amount of machining to be done by the discharges and the temperature rise in the gap also change. The temperature rise caused by an increase or decrease in the number of discharge pulses per unit time T is controlled correspondingly, and the fluid flow (flow rate) of the coolant (machining fluid) for discharging sludge occurring at machining is controlled. More specifically, when the machining rate is high due to an increase in the number of discharge pulses per unit time T, the coolant flow is increased to suppress the temperature rise in the gap, so that the sludge is discharged smoothly. When the machining rate is low and the number of discharge pulses per unit time T is small, on the other hand, the coolant flow is reduced to prevent overcooling, suppressing wire vibration to stabilize discharging.

The following equations hold for the relation between machining state and coolant flow, where "w" is the amount of sludge per discharge pulse, Qs and Qx are the amounts of sludge removed by the numbers Ps and Px of discharge pulses per unit time, respectively, and FRs and FRx are the corresponding coolant flows.

$$Ps \propto Qs/w \qquad (30)$$

$$Px \propto Qx/w \qquad (31)$$

$$Qx/FRx \propto Qs/FRs \qquad (32)$$

Equations (30), (31), and (32) above yield the following equation (33)

$$FRx \propto FRs \times (Px/Ps) \qquad (33)$$

That is, fluid flow can be controlled according to the amount of sludge by varying the fluid flow FR with use of an evaluation function which is obtained by multiplying the value of the reference coolant flow FRs by a ratio of the reference number Ps of discharge pulses per unit time to the varying number Px of discharge pulses.

When the coolant flow FR is varied according to equation (33), the ratios κ determined in advance for various materials, workpiece thickness, and wire electrode diameters can be used as described above. The reference number Ps of discharge pulses per unit time is obtained by multiplying the predetermined ratio κ by the set feed speed SPD (=κ×SPD) to perform calculation of equation (33).

In the machining rate control described above, to prevent successive short circuits from occurring at the start of machining, set feed speed is lowered when a short circuit is detected in the range within which machining remains unstable from the point where discharges are recognized after machining starts from a machining start point, so that control is performed according to the machining rate, and the normal feed speed is restored after the machining position leaves the above unstable range. The occurrence of short circuits is suppressed by reducing machining speed when a short circuit occurs within the machining unstable range, thereby suppressing subsequent occurrence of short circuits. Thus, the number of short circuits, if they occur in the unstable machining range, is thereby limited to one, preventing the occurrence of subsequent series of short circuits.

Even during control of this type, the machining rate control described above is performed. In the machining rate control, the machining rate is reduced by lowering machining speed, so that machining energy and machining fluid flow are lowered, enabling the machining to proceed stably.

Figure 1B:
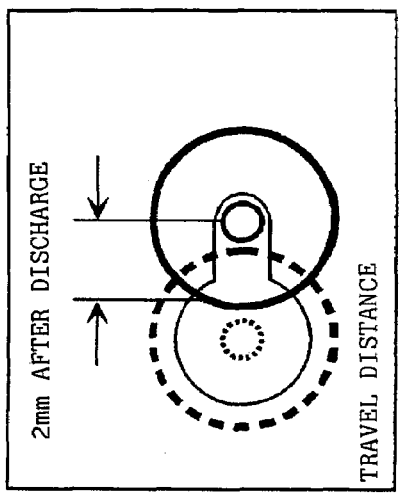
Figure 1C:
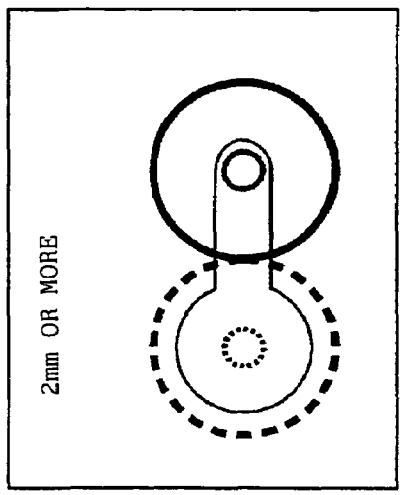
Figure 2:
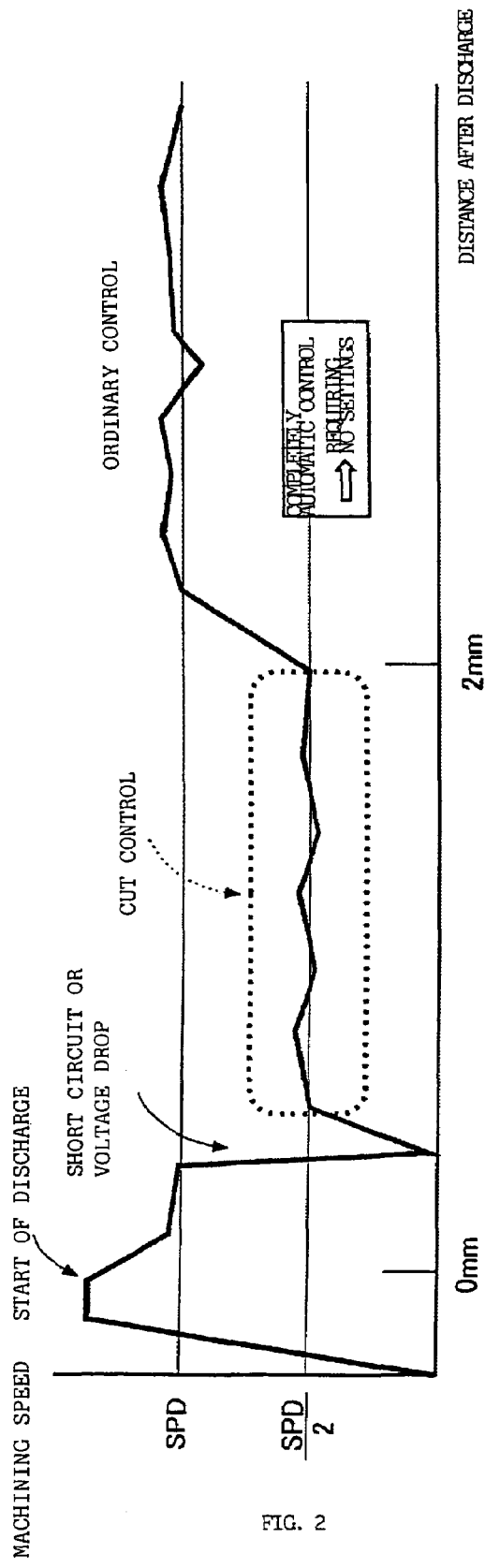
FIG. 2 is a graph representing the relation between a machining speed and a machining travel distance after a discharge.

FIGS. 1A to 1C illustrate how the controller of a wire electrical discharge machine according to the present invention suppresses successive occurrence of short circuits at the start of machining. FIG. 2 is a graph representing the relation between a machining speed and a machining travel distance after the start of discharge. The control method for suppressing successive occurrence of short circuits at the start of machining is referred to below as "cut control."

FIG. 1A shows the state when machining starts. The large and small dotted circles in FIG. 1A represent the positions of the nozzle and wire electrode, respectively, relative to the workpiece at the start of machining. The large and small solid circles in FIG. 1A represent the positions of the nozzle and wire electrode, respectively, relative to the workpiece at the start of discharge.

"G92" in FIG. 1A is a G-code for setting work coordinate system with which a machining start position on the workpiece is set. This G-code can be set in advance in a program in the numerical controller. Electrical discharge machining proceeds from the position on the workpiece which is set by G92 as the machining start point and follows a path defined in the program.

Discharges start after machining has started from the machining start point. FIG. 1A shows the relation between the machining start point and the discharge start point (the point at which a discharge starts while a wire electrode is being fed after the start of machining). The distance from the machining start point to the discharge start point varies with each discharge, depending on discharge conditions, workpiece conditions, and the like.

In cut control according to the present invention, machining is stabilized by determining the reference feed speed in equation (5) to a feed speed lower than the feed speed determined in normal control. According to the present invention, cut control is not always carried out when machining starts, but it is carried out only when a short circuit occurs within a predetermined distance from a discharge start point, so that the machining speed and machining efficiency are not unnecessarily lowered.

In the present invention, the decision as to whether to carry out cut control is made within a predetermined distance from the discharge start point. This "predetermined distance" can be defined by the position of a nozzle relative to a machining start hole, for example, and may be equal to the radius of the nozzle. However, the predetermined distance is not limited to the radius of the nozzle, which is just an example. The distance may be defined by another ratio to the nozzle radius, or by the ratio of the nozzle radius to the radius of the machining start hole. The distance may also be determined experimentally.

In FIG. 2, SPD is a set feed speed used in normal control, while SPD/2 is a set feed speed used in cut control. In this example, the set feed speed for cut control is half the set feed speed SPD in normal control. However, the ratio of set feed speed in cut control to set feed speed in cut control is not necessarily 1/2, but may be other value lower than 1.

FIG. 1B shows an example in which the predetermined distance is 2 mm. The value of 2 mm is derived from, for example, a nozzle radius of 2 mm. A decision as to whether to use, as the reference feed speed, a set feed speed SPD in normal control or a set feed speed in cut control is made within the predetermined distance (2 mm in this example) from the machining start point. If a short circuit occurs while the distance from the wire electrode to the workpiece is within the predetermined distance, the machining speed is reduced by cut control to a speed lower than a feed speed in normal control.

In FIG. 2, the vertical axis indicates a machining speed and the horizontal axis indicates a distance from a discharge start point (0 mm). After discharging has started, machining speed is controlled using the set feed speed SPD. If a short circuit or voltage drop occurs within the predetermined distance (2 mm in this example) from the reference position (0 mm) where discharge starts, normal control is switched over to cut control, and the machining speed is controlled by switching feed speed from the reference feed speed SPD in normal control to a feed speed SPD/2 in cut control. Cut control continues until the predetermined distance is exceeded. In FIG. 2, the range of cut control is indicated by the dotted rectangle.

Cut control is terminated at the point at which the distance between the wire electrode and workpiece exceeds the predetermined distance. After that, feed speed is switched over to the set feed speed in normal control and machining is continued.

In FIG. 1C, the distance from the wire electrode to the workpiece exceeds the predetermined distance (2 mm in this example) from the machining start point. In this state, normal control is carried out using the original feed speed. Referring back to FIG. 2, cut control using the set feed speed SPD/2 is switched over to normal control using the set feed speed SPD. This switching of the reference feed speed is controlled automatically, by detecting the fact that the travel of a wire electrode exceeds the predetermined distance, requiring no settings by an operator.

If no short circuit occurs within the predetermined range shown in FIG. 1B, the reference feed speed remains at the normal feed speed.

Figure 3:
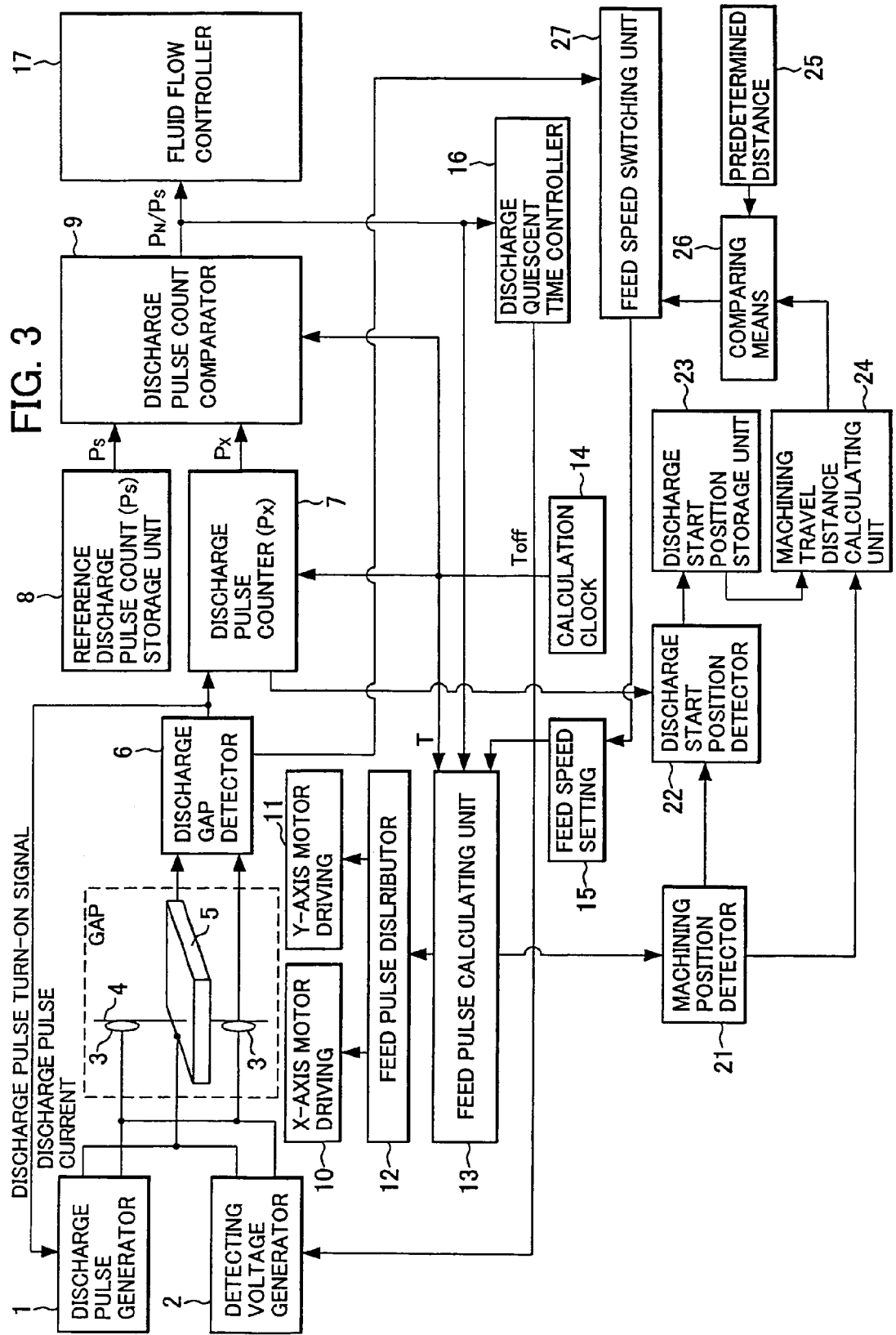
FIG. 3 is a block diagram illustrating main elements of a first embodiment of the controller for a wire electrical discharge machine according to the present invention.

FIG. 3 is a block diagram illustrating main elements of a first embodiment of the controller for a wire electrical discharge machine according to the present invention.

Reference numeral 1 in FIG. 3 indicates a discharge pulse generator comprising a circuit having transistors and other active elements for generating discharge pulse current, a capacitor charging/discharging circuit, a direct current power supply, etc. One of the outputs from the discharge pulse generator 1 is connected to the workpiece 5 and the other is connected to contact brushes 3 disposed above and below the workpiece 5, supplying pulsed discharge current to a gap between the running wire electrode 4 and workpiece 5.

Reference numeral 2 indicates a detecting voltage generator comprising a direct current power supply, a circuit having resistors, capacitors, and active elements such as transistors etc. for generating a voltage for detecting the state of the gap, and other components. One of the outputs from the detecting voltage generator 2 is connected to the workpiece 5, and the other is connected to the contact brushes 3 disposed above and below the workpiece 5. The driving of a table (not shown) on which the workpiece 5 is mounted is controlled by a moving means comprising an X-axis motor driving unit 10, Y-axis motor driving unit 11, and feed pulse distributor 12.

Reference numeral 6 indicates a discharge gap detector that uses the detecting voltage to determine whether the gap is ready for a discharge. One of the inputs to the discharge gap detector 6 is connected to the workpiece 5, and the other is connected to the contact brushes 3 disposed above and below the workpiece 5. Upon determining that discharging is possible, the discharge gap detector 6 outputs a discharge pulse turn-on signal to both the discharge pulse generator 1 and the discharge pulse counter 7.

The discharge gap detector 6 has means for detecting short circuits by comparing the voltage between the wire and workpiece during machining with a voltage set as a machining condition, or by another method.

The discharge pulse counter 7 uses a signal outputted from the calculation clock 14 every unit time (for each fixed period) T to count the number of discharge pulse turn-on signals during these periods, thus counting the number of discharge pulses between the wire electrode 4 and workpiece 5.

Reference numeral 8 indicates a reference discharge pulse count storage unit that stores the reference number Ps of discharge pulses per unit time.

The discharge pulse count comparator 9 compares the number Px of discharge pulses per unit time (fixed period) T as counted by and stored in the discharge pulse counter 7 with the reference number Ps of discharge pulses per unit time T, which is stored in advance in and supplied by the reference discharge pulse count storage unit 8, calculates the ratio (Px/Ps) of the number Px of discharge pulses to the reference number Ps of discharge pulses, and outputs the ratio to the feed pulse calculating unit 13, the discharge quiescent time controller 16, and the fluid flow rate controller 17.

To obtain the travel distance (the amount of movement) Δx, at each signal from the calculation clock 14 marking the fixed period T, the feed pulse calculating unit 13 multiplies a distance (SPD×T) obtained from the reference feed speed SPD sent from the speed setting means 15 and the fixed period T by the ratio (Px/Ps) of the discharge pulse count Px to the reference discharge pulse count Ps, which is sent from the discharge pulse count comparator. That is, the feed pulse calculating unit 13 performs the calculation in equation (5) above to obtain the travel distance Δx. A pulse string in association with the obtained distance Δx is outputted to the feed pulse distributor 12.

The feed pulse distributor 12 distributes X- and Y-axis driving pulses to the X- and Y-axis motor driving units 11, and drives the X- and Y-axis motors that drive the table on which the workpiece is mounted.

The discharge quiescent time controller 16 obtains the quiescent time Toff by selectively using equation (29) or (26) according to the ratio (Px/Ps) outputted from the discharge pulse count comparator 9, using equation (29) when Px≦Ps and equation (26) when Px>Ps, and then outputs the obtained Toff to the detecting voltage generator 2. After pausing for the quiescent time Toff, the detecting voltage generator 2 applies a voltage to the gap between the wire electrode 4 and workpiece 5. Thus, the discharge quiescent time is controlled according to an evaluation function that is set so as to restrain the supply of extra energy.

The fluid flow rate controller 17 uses the ratio (Px/Ps), which is output from the discharge pulse count comparator 9, of the number Px of discharge pulses to the reference number Ps of discharge pulses to control the fluid flow according to an evaluation function such as the one shown by equation (33).

As described above, the travel distance, the quiescent time, and the coolant flow are controlled every preset time according to the ratio (Px/Ps) of the number Px of discharge pulses to the reference number Ps of discharge pulses and other data, thereby restraining the supply of extra energy, increasing the machining speed, and improving the machining accuracy.

The controller for a wire electrical discharge machine according to the present invention has, as an arrangement for cut control, a machining point detector 21, discharge start point detector 22, discharge start point storage unit 23, machining travel distance calculating unit 24, predetermined distance storage unit 25, comparing means 26, and feed speed setting switching unit 27.

The machining point detector 21 receives the travel distance (the amount of movement) calculated by the feed pulse calculating unit 13 and determines the machining point. The discharge start point detector 22 obtains the discharge start point by finding the machining point given by the machining point detector 21 at the instant when the discharges start. This instant can be determined by detecting the number Px of discharge pulses given by the discharge pulse counter 7.

The discharge start point detected by the discharge start point detector 22 is stored in the discharge start point storage unit 23. The discharge start point stored in the discharge start point storage unit 23 is used as the reference point from which the predetermined distance, within which the decision as to whether to perform cut control is made, extends.

The machining travel distance calculating unit 24 receives a machining point detected by the machining point detector 21, and uses the machining point and the discharge start point stored in the discharge start point storage unit 23 to calculate the machining travel distance ("distance after discharge", shown in FIG. 2) extending from the discharge start point.

The comparing means 26 compares the machining travel distance obtained from the machining travel distance calculating unit 24 with the predetermined distance and determines whether the machining travel distance is within the predetermined distance.

If the machining travel distance is within the predetermined distance, the comparing means 26 notifies the feed speed switching unit 27 that the condition stipulating that the machining travel distance must be within the predetermined distance from the discharge start point is satisfied. A feature of the present invention is that the feed speed is switched when two conditions are both satisfied, one condition being that the machining travel distance is within the predetermined distance and the other being that a short circuit has occurred.

The feed speed setting switching unit 27 switches the set feed speed sent from the feed speed setting means 15 to the feed pulse calculating unit 13 when it ascertains from the comparison result from the comparing means 26 that the machining travel distance is within the predetermined distance and from the detection output from the discharge gap detector 6, which is a short circuit detecting means, that a short circuit has occurred. The feed speed setting means 15 sends a renewed feed speed (for example, SPD/2) to the feed speed calculating unit 13.

The feed pulse calculating unit 13 calculates the number of feed pulses according to the set feed speed (for example, SPD/2). Feed pulse count to be calculated is reduced by switching the reference feed speed.

Another feature of the present invention is that speed control is carried out by restoring the set feed speed to the normal feed speed at the point where the predetermined distance is exceeded only if the set feed speed has been switched over to another feed speed due to occurrence of a short circuit within the predetermined distance, as described above.

Accordingly, after a switchover of the set feed speed due to a short circuit, when machining proceeds and the machining travel distance exceeds the predetermined distance from the from the discharge start point, the comparing means 26 decides that the predetermined distance from the discharge start point has been exceeded and sends a signal to the feed speed switching unit 27. The feed speed switching unit 27 receives the signal from the comparing means 26, and if a switchover of set feed speed has been made due to a short circuit, restores the original feed speed (for example, SPD) and sends it to the feed pulse calculating unit 13. The feed pulse calculating unit 13 calculates the number of pulses according to the set feed speed (for example, SPD). Because the reference feed speed is restored, the calculated feed pulse count becomes feed pulse count used in normal control.

Figure 4:
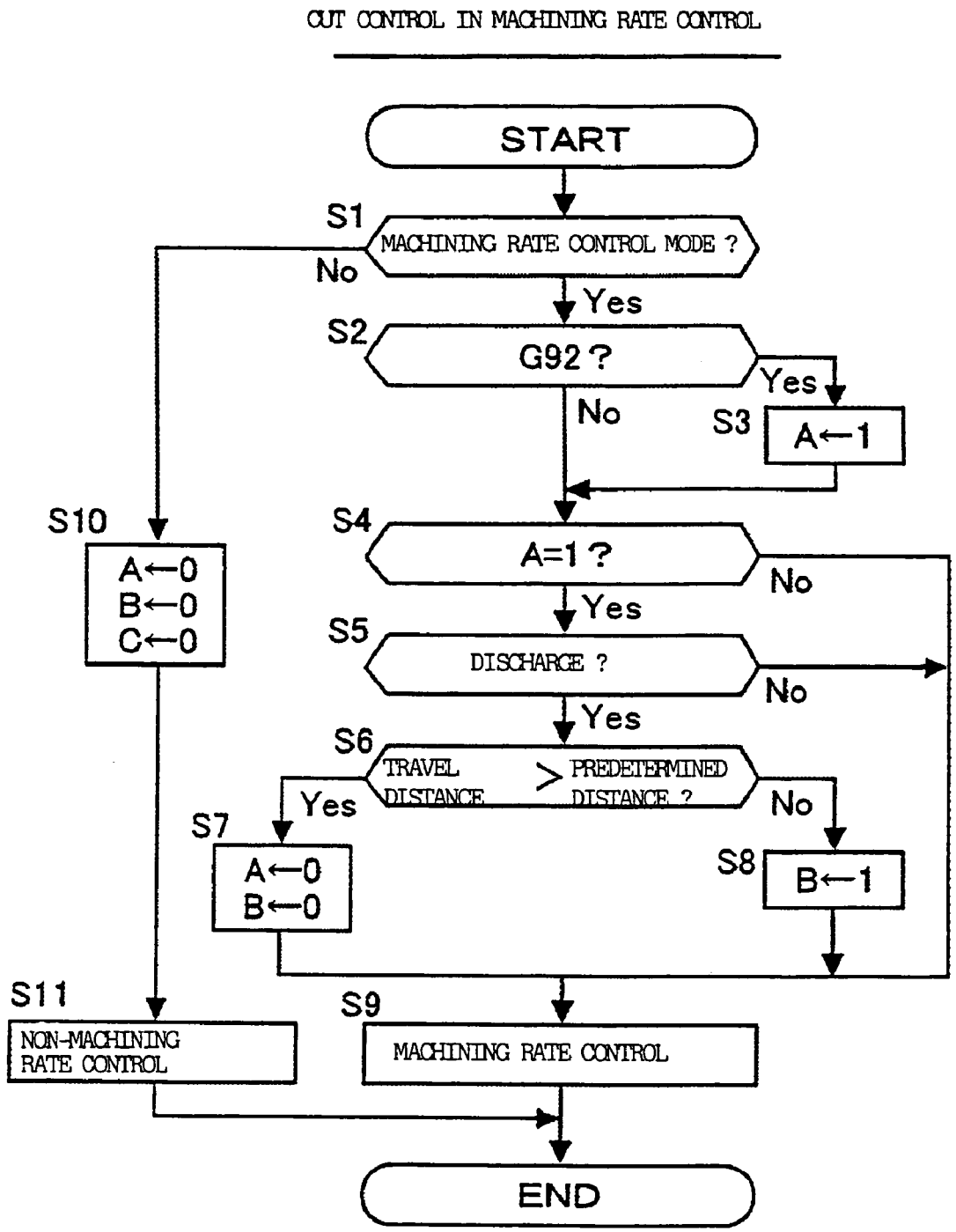
FIG. 4 is a flowchart illustrating how the controller of the present invention controls cutting.

FIG. 4 is a flowchart illustrating cut control. Cut control is performed as one aspect of the machining rate control described above.

If control mode is machining rate control mode (step S1), establishment of a machining start point in the machining program is confirmed. Establishment of the machining start point can be confirmed from, for example, the execution of a position setting code such as G92. Movement to the machining start hole can be confirmed not only by a code such as the above G92 code but also by another command (step S2).

Normally, after the machining start point has been established, control for starting machining is carried out. In control of this type, according to the present invention, cut control is carried out to prevent repeated short circuits from occurring. Whether to perform cut control is determined only while the machining point is within a cut control setting range (see a range of dotted line in FIG. 2), so a decision flag A is provided to set the cut control setting range, and a "1" is set in flag A (step S3).

In step S2, if the machining start point is not established or "1" is not set in the cut control setting range decision flag A, normal machining rate control is performed (step S9), judging that cut control is not to be carried out (step S4). In normal machining rate control, the predetermined reference feed speed SPD is used as the set feed speed.

If "1" is set in the cut control setting range decision flag A in step S4 above, presence or absence of a discharge is checked, judging that cut control is to be carried out.

When discharges are detected (step S5), the point at which the discharges started is used as a reference point and the distance traveled from the reference point is compared with the predetermined distance. For example, the discharge start point is stored in the discharge start point storage unit 23 in FIG. 3, the distance traveled from the discharge start point is calculated by the machining travel distance calculating unit 24, and the calculated value is compared with the predetermined distance by the comparing means 26. The predetermined distance is equivalent to the cut control setting range within which cut control is performed. Therefore, if the distance traveled from the discharge start point exceeds the predetermined distance (step S6) indicating that the machining point is out of the cut control setting range, "0" is set in the cut control setting range decision flag A and "0" is set in a short-circuit decision flag B (step S7).

Conversely, if the distance traveled from the discharge start point is within the predetermined distance (step S6), indicating that the machining point is within the cut control setting range, "1" is set in the short-circuit decision flag B. The cut control setting range decision flag A has already been set to "1" (step S8).

Machining rate control is performed when "0" is set in both the cut control setting range decision flag A and short-circuit decision flag B in step S7 and when "1" is set in both flags A and B in step S8. If no discharge occurs in step S5, machining rate control is performed as in step S7, with "0" set in both flags A and B.

When, machining rate control is not performed in step S1, "0" is set in flags A and B and also in a short-circuit detection flag C, and any control other than rate machining control is performed (step S11).

The procedures in the above flowchart do not require settings by an operator or settings for special program commands or the like, and can be carried out automatically based on decisions made by software.

Next, the machining rate control in step S9 above will be described with reference to the flowchart in FIG. 5.

In machining rate control, machining speed is switched over according to the state of flag B, which is set in cut control as shown in the flowchart in FIG. 4 to prevent short circuits from occurring repeatedly at the start of machining.

Whether "1" is set in the short-circuit decision flag B or not is checked (step S21). If "1" is set in flag B and a short circuit is detected (step S22), "1" is set in the short-circuit detection flag C (step S23).

If "0" is set in the short-circuit decision flag B, "0" is set in the short-circuit detection flag C (step S24).

The state of the short-circuit detection flag C is now checked (step S25), and the setting of the feed speed is switched over according to the value.

If "1" is set in the short-circuit detection flag C in step S25, indicating that a short circuit has occurred, a new reference feed speed SPD' is set to a value lower than the normal feed speed SPD, for example, to a half (SPD'=SPD/2) the normal feed speed (step S26).

Conversely, if "0" is set in the short-circuit detection flag C in step S25, indicating that no short circuit has occurred, the feed speed SPD' is set to the normal feed speed (step S27). Machining rate control is performed using the feed speed SPD' set in step S26 or S27 above (step S28).

As described above, whether a short circuit has occurred or not is determined, and the speed can be reduced only when the operating range in normal machining rate control is exceeded, by switching the reference feed speed only if a short circuit is detected while the distance traveled from the discharge start point is within the predetermined distance from the discharge start point.

Because the number of discharge pulses is reduced as an effect of the speed reduction, the effects of energy control and machining fluid control increase, causing the machining process to stabilize in viewpoint of machining conditions as well.

More specifically, if machining rate control is performed and machining rate is reduced, the machining process is made stable since such machining conditions as the energy and fluid flow are held low in association with the reduction of machining rate. As a result, wire breakage is automatically prevented, making it unnecessary to prepare weakened machining conditions as in the prior art.

Examples of operation by the controller of the present invention will be described below using FIGS. 6A to 6C and 7A to 7C. FIGS. 6A and 7A show the time elapsed from the start of machining, FIGS. 6B and 7B show the feed speed setting, and FIGS. 6C and 7C show control modes.

FIGS. 6A to 6C illustrate how the controller of the present invention operates to lower the feed speed when a short circuit occurs within the predetermined distance from the discharge start point. In FIG. 6A, measurement of the predetermined distance starts upon the start of discharge after machining has started. At the start of machining, the set feed speed is set to the normal feed speed v1 (FIG. 6B) as normal control is performed as in FIG. 6C.

If a short circuit is detected within the predetermined distance from the start of discharge, normal control is switched over to cut control (FIG. 6C) at the point at which the short circuit is detected, and the set feed speed is switched over from the normal feed speed v1 to a feed speed v2 lower than v1 (FIG. 6B). When the distance traveled from the discharge start point reaches the predetermined distance, the control mode is switched from cut control back to normal control and the set feed speed is also returned to the normal feed speed v1.

Figure 10A:
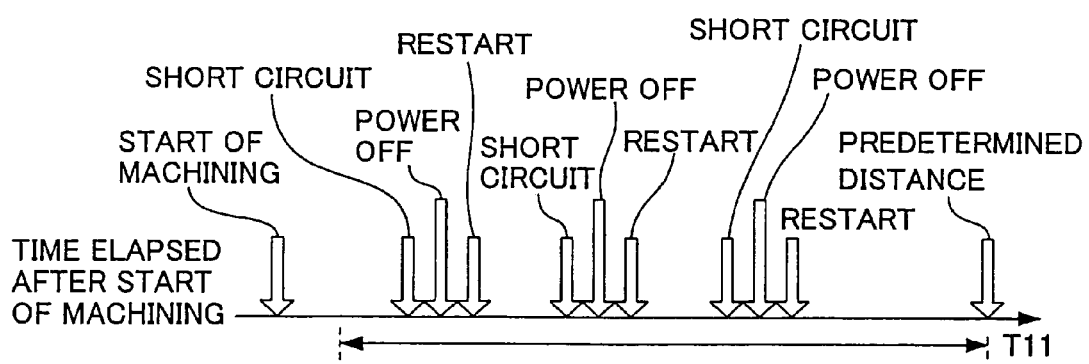
FIGS. 10A and 10B illustrate how machining proceeds when a short circuit occurs within a predetermined distance from a machining start point.
Figure 10B:
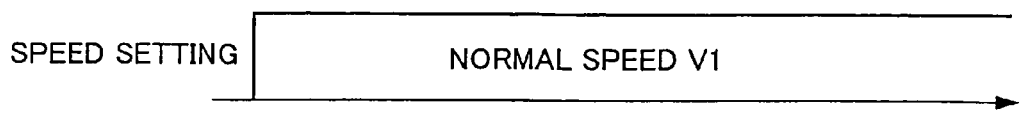
Figure 11A:
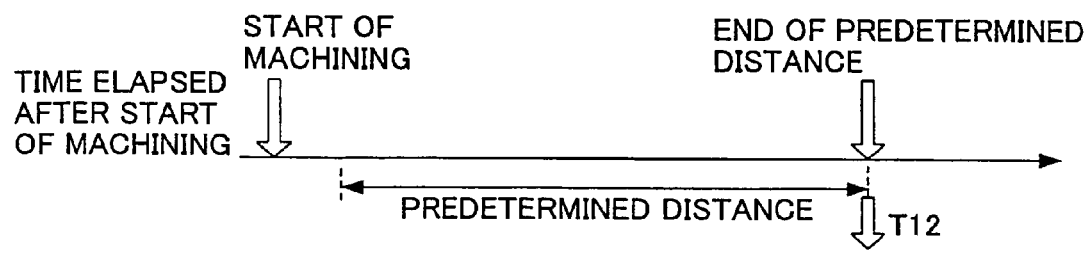
FIGS. 11A and 11B illustrate how a set feed speed is switched at a point removed by the predetermined distance from a machining start point.
Figure 11B:
Figure 3:
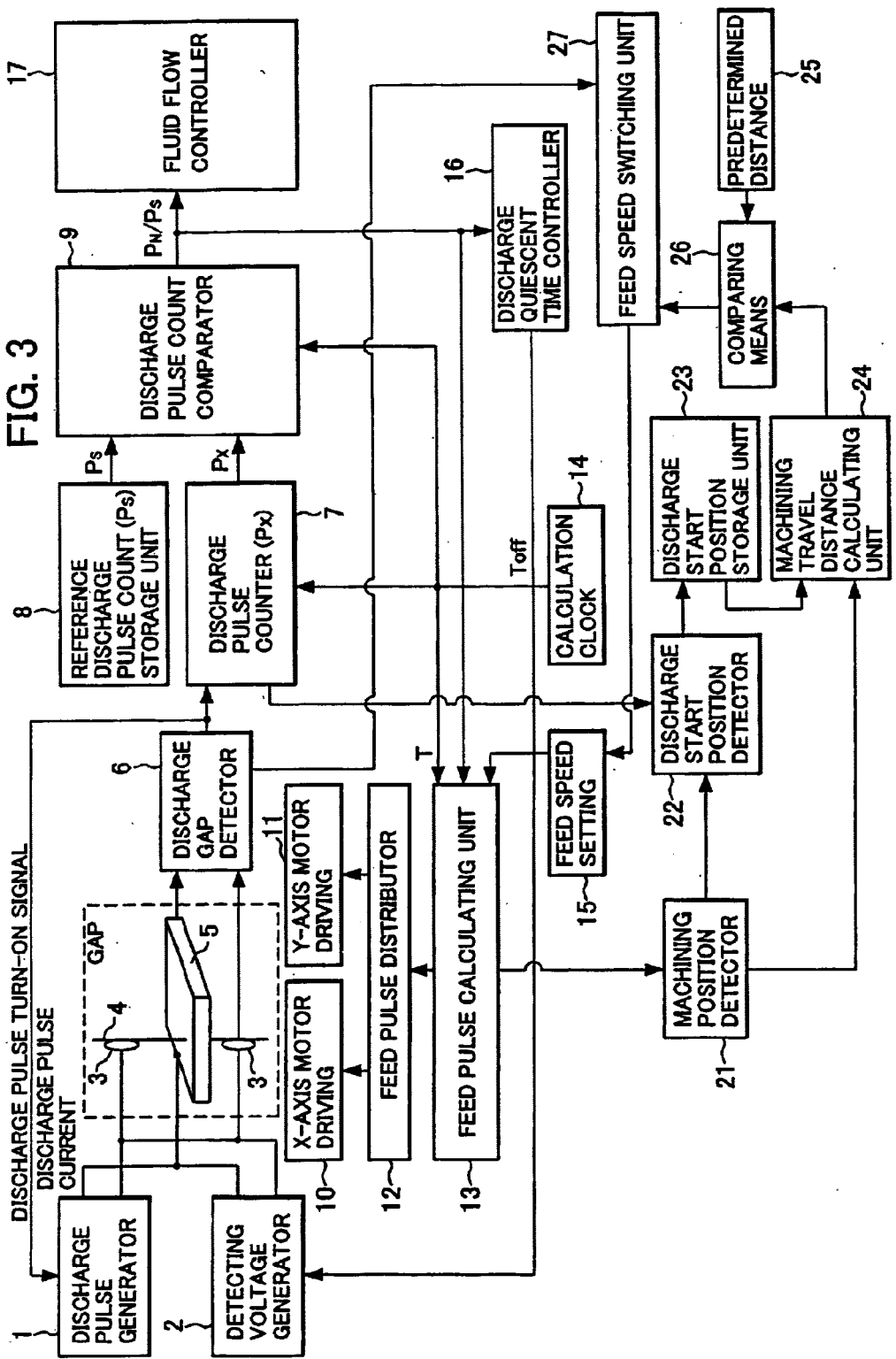

The time required for machining process will now be compared by using the time required for moving the predetermined distance from the start of discharge. As shown in FIGS. 6A to 6C, the wire electrode is moved with respect to the workpiece at a normal feed speed v1 until a short circuit occurs, and is moved at a feed speed v2 lower than the feed speed v1 from the point when a short circuit occurs until the travel distance from the start of discharge reaches the predetermined distance. Thus, the time required for traveling the predetermined distance is T1. Comparing with the time T11 required for moving the predetermined distance when short circuits occur repeatedly (FIG. 10A), and with the time T12 required when the entire predetermined distance is traveled at the low feed speed (FIG. 11A), the above T1 is shorter than these T11 and T12.

FIGS. 7A to 7C show a case where no short circuit occurs within the predetermined distance during operation according to the present invention. In FIG. 7A, measurement of the predetermined distance is started once a discharge starts after machining has started. At the start of machining, the feed speed is set to the normal feed speed v1 (FIG. 7B) by normal control as in FIG. 7C.

If no short circuit is detected within the predetermined distance, a switchover to cut control does not take place (FIG. 7C), and the normal feed speed v1 is maintained (FIG. 7B). Accordingly, normal control is carried out at the normal feed speed v1, regardless of whether or not the distance traveled from the discharge start point is within the predetermined distance.

The time required for machining process will now be compared again using the time required for moving the predetermined distance from the start of discharge. As shown in FIGS. 7A to 7C, because no short circuit occurs, the entire predetermined distance is traveled at the normal feed speed v1, and the time required for traveling the predetermined distance is T2. Comparing with the time T11 required when short circuits occur repeatedly (FIG. 10A), and with the time T12 required when the entire predetermined distance is traveled at a low feed speed (FIG. 11A), the above time T2 is shorter than these T11 and T12, and even shorter than the time T1 required when a short circuit occurs in FIG. 6A.

If the process at the start of machining is performed a plurality of times, a short circuit does not necessarily occur every time. There may be cases in which no short circuit occurs as shown in FIGS. 7A to 7C, but regardless of whether there is a short circuit or not, the time required for traveling the predetermined distance is shorter than the time required when cut control according to the present invention is not performed.

Figure 8:
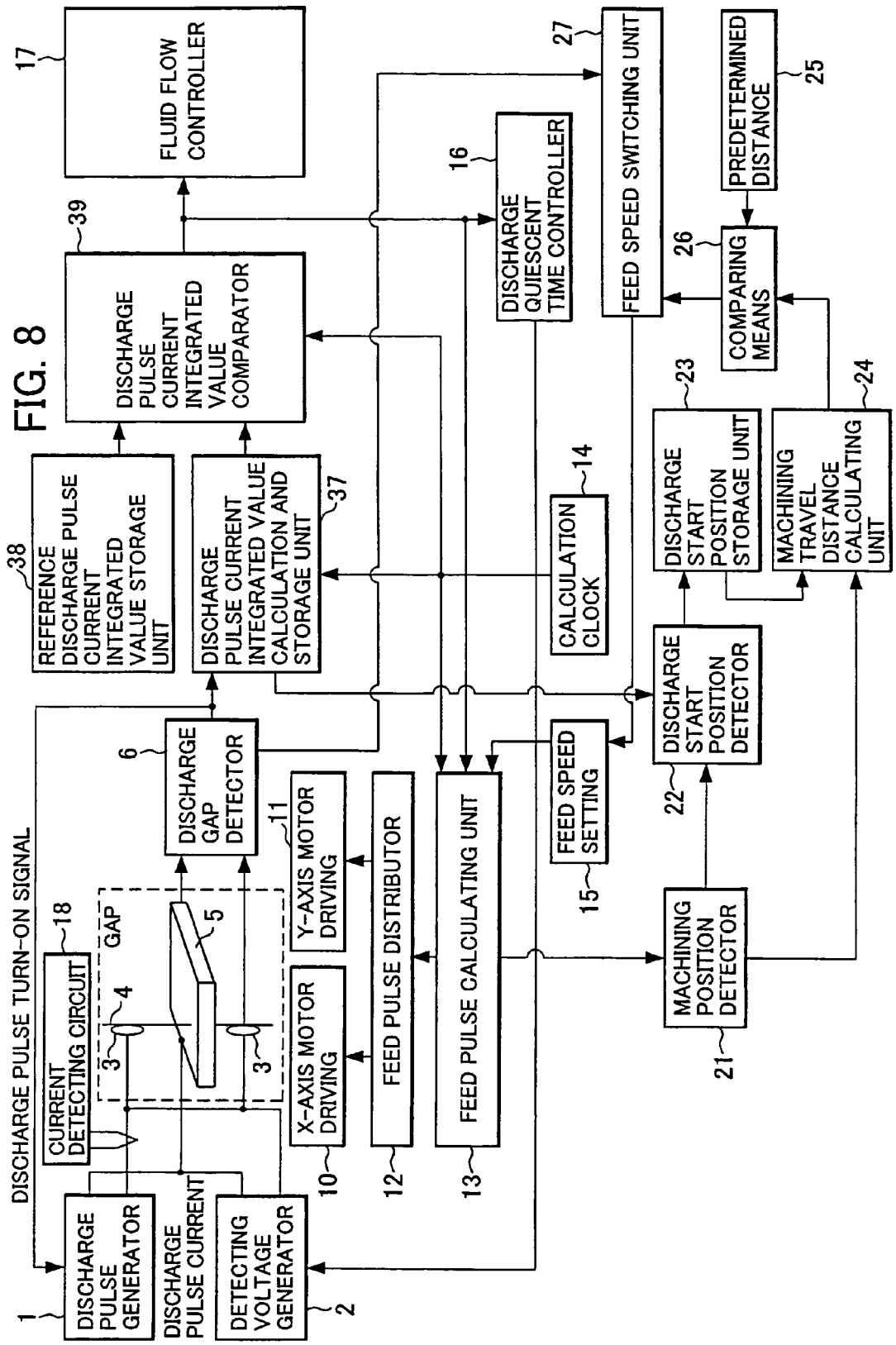
FIG. 8 is a block diagram illustrating main elements of a second embodiment of the controller for a wire electrical discharge machine according to the present invention.
Figure 9A:
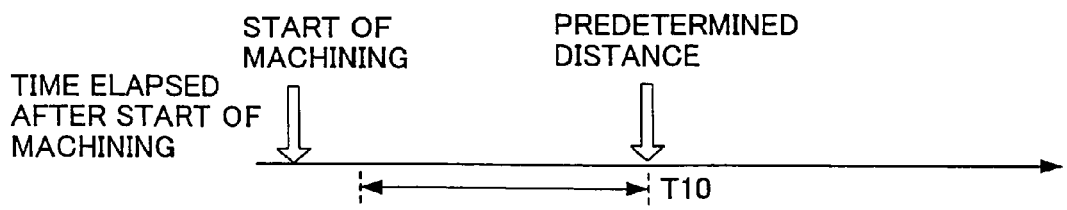
FIGS. 9A and 9B illustrate how machining proceeds when a short circuit does not occur within a predetermined distance from a machining start point.
Figure 9B:
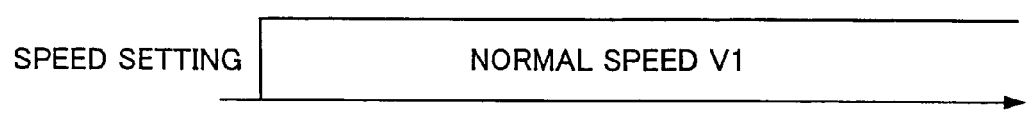

FIG. 8 is a block diagram illustrating main elements of a second embodiment of the controller for a wire electrical discharge machine according to the present invention. Only the differences from the first embodiment shown in FIG. 3 will be described below.

In the second embodiment, instead of counting and storing the number of discharge pulses, the integrated value of discharge pulse current is obtained from a current detecting circuit 18 and a discharge pulse current integrated value calculation and storage unit 37. Further, instead of the reference discharge pulse count storage unit, a reference discharge pulse current integrated value storage unit 38 is provided. Then, ratios used for controlling feed pulses, discharge quiescent time and fluid flow are calculated and outputted by a discharge pulse current integrated value comparator 39.

More specifically, a reference integrated value of the discharge pulse current is set, instead of the reference number Ps of discharge pulses per unit time used in the first embodiment shown in FIG. 3, and the discharge pulse current is integrated during machining, instead of counting number Px of discharge pulses per unit time T, which varies moment by moment during machining. Reference values may be obtained in advance for various materials, workpiece thickness and wire diameters for later use in the same way as when the κ ratio is obtained.

The second embodiment differs from the first embodiment only in that the integrated value of the discharge pulse current is used, instead of the number of discharge pulse. The second embodiment is, in other aspects including operation and effects, the same as in the first embodiment. Cut control can also be implemented in the same way as in the first embodiment.

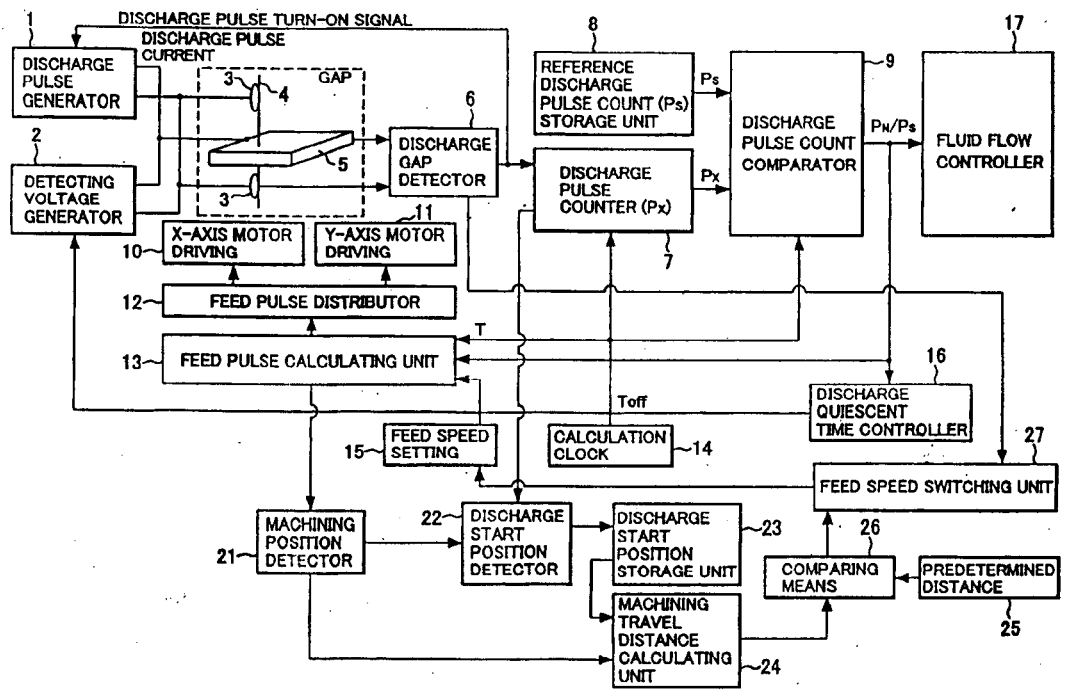

What is claimed is:

1. A controller for a wire electrical discharge machine that supplies discharge pulse current between a wire electrode and a workpiece to perform electrical discharge machining while causing relative motion between the wire electrode and the workpiece, the controller comprising:
   discharge pulse counting means for counting the number of supplied discharge pulses every preset time;
   moving means for causing relative motion between the wire electrode and the workpiece along a machining path according to motion commands;
   reference discharge pulse count storage means for storing a reference number of discharge pulses per unit time;
   discharge pulse count comparing means for comparing a value obtained from the discharge pulse counting means with a value obtained from the reference discharge pulse count storage means and obtaining a ratio therebetween;
   feed pulse calculating means for obtaining a distance by multiplying a relative movement of the wire electrode with respect to the workpiece, which is determined from a set feed speed and said preset time, by the ratio and for sending the obtained distance to the moving means as a movement command every said preset time;
   discharge start point detecting means for detecting a discharge start point by detecting occurrence of a discharge;
   machining travel distance calculating means for calculating a machining travel distance from the discharge start point;
   comparing means for comparing the machining travel distance with a predetermined distance;
   short circuit detecting means for detecting a short circuit between the wire electrode and the workpiece; and
   feed speed setting switching means for switching a set feed speed;
   wherein, according to a comparison result obtained from the comparing means and to detection output from the short circuit detecting means, the feed speed setting switching means switches to a low feed speed when a short circuit is detected while the machining travel distance is within the predetermined distance, and switches to a normal feed speed when the machining travel distance exceeds the predetermined distance.

2. The controller according to claim 1, wherein the discharge start point detecting means detects the discharge start point according to the number of discharge pulses.

3. The controller according to claim 1, further comprising discharge quiescent time control means for controlling a discharge quiescent time according to the comparison result from the discharge pulse count comparing means so that the value that the discharge pulse counting means obtains every preset time matches the value stored in the reference discharge pulse count storage means.

4. The controller according to claim 1, further comprising discharge quiescent time control means for controlling a discharge quiescent time according to the comparison result from the discharge pulse count comparing means so as to restrain the supply of extra energy.

5. The controller according to claim 1, wherein coolant flow is controlled according to the ratio obtained by the discharge pulse count comparing means.

6. A controller for a wire electrical discharge machine that supplies discharge pulse current between a wire electrode and a workpiece to perform electrical discharge machining while causing relative motion between the wire electrode and the workpiece, the controller comprising:

discharge pulse current integrating means for integrating supplied discharge pulse current every preset time;

moving means for causing relative motion between the wire electrode and the workpiece along a machining path according to commands;

reference integrated discharge pulse current value storage means for storing time-integrated value of a reference discharge pulse current;

integrated discharge pulse current value comparing means for comparing a value obtained from the discharge pulse current integrating means with a value obtained from the reference integrated discharge pulse current value storage means and for obtaining a ratio therebetween;

feed pulse calculating means for obtaining a distance by multiplying a relative movement of the wire electrode with respect to the workpiece, which is determined from a set feed speed and said preset time, by the ratio and for sending the obtained distance to the moving means as a movement command every said preset time;

discharge start point detecting means for detecting a discharge start point by detecting occurrence of a discharge;

machining travel distance calculating means for calculating a machining travel distance from the discharge start point;

comparing means for comparing the machining travel distance with a predetermined distance;

short circuit detecting means for detecting a short circuit between the wire electrode and the workpiece; and feed speed setting switching means for switching the feed speed setting;

wherein, according to a comparison result obtained from the comparing means and to detection output from the short circuit detecting means, the feed speed setting switching means switches to a low feed speed when a short circuit is detected while the machining travel distance is within the predetermined distance, and switches to a normal feed speed when the machining travel distance exceeds the predetermined distance.

7. The controller according to claim 6, further comprising discharge quiescent time control means for controlling the discharge quiescent time according to the comparison result from the discharge pulse current integrated value comparing means so as to restrain the supply of extra energy.

8. The controller according to claim 6, wherein the discharge start point detecting means detects the discharge start point according to an integrated value of the discharge pulse current.

9. The controller according to claim 6, wherein the coolant flow is controlled according to the ratio obtained by the discharge pulse current integrated value comparing means.

* * * * *

UNITED STATES PATENT AND TRADEMARK OFFICE
CERTIFICATE OF CORRECTION

PATENT NO. : 6,998,562 B2
APPLICATION NO. : 11/141471
DATED : February 14, 2006
INVENTOR(S) : Arakawa et al.

It is certified that error appears in the above-identified patent and that said Letters Patent is hereby corrected as shown below:

The title page showing the illustrative figure should be deleted to be replaced with the attached title page.

The drawing sheet, consisting of Fig. 3, should be deleted to be replaced with drawing sheet, consisting of Fig. 3, as shown on the attached page.

On the title page item (57), line 5,
delete "our" and insert --out-- column 14, line 22 after "(33)" insert --.-- column 19, line 46 after "(step S6)" insert --,--

Signed and Sealed this

Third Day of October, 2006

JON W. DUDAS
*Director of the United States Patent and Trademark Office*

(12) United States Patent
Arakawa et al.

(10) Patent No.: US 6,998,562 B2
(45) Date of Patent: Feb. 14, 2006

(54) CONTROLLER FOR A WIRE ELECTRICAL DISCHARGE MACHINE

(75) Inventors: Yasuo Arakawa, Yamanashi (JP); Toshiyuki Ogata, Yamanashi (JP); Kaoru Hiraga, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/141,471

(22) Filed: Jun. 1, 2005

(65) Prior Publication Data
US 2005/0269296 A1    Dec. 8, 2005

(30) Foreign Application Priority Data
Jun. 2, 2004   (JP) ............................. 2004/164828

(51) Int. Cl.
B23H 1/00    (2006.01)
B23H 7/02    (2006.01)
B23H 7/20    (2006.01)
(52) U.S. Cl. ............................. 219/69.12; 219/69.16
(58) Field of Classification Search ............. 219/69.12, 219/69.16, 69.19; 700/162
See application file for complete search history.

(56) References Cited

U.S. PATENT DOCUMENTS

| 5,220,146 | A | 6/1993 | Masicovetere et al. | |
| 5,852,268 | A * | 12/1998 | Buhler et al. | 219/69.12 |
| 6,278,075 | B1 * | 8/2001 | Kamiguchi et al. | 219/69.12 |
| 6,723,941 | B2 * | 4/2004 | Sato et al. | 219/69.12 |
| 2002/0128743 | A1 * | 9/2002 | Kurihara et al. | 700/162 |

FOREIGN PATENT DOCUMENTS

| JP | 1-264718 | 10/1989 |
| JP | 4-201120 | 7/1992 |
| JP | 5-104330 | 4/1993 |
| JP | 5-111822 | 5/1993 |
| JP | 6-277949 | 10/1994 |
| JP | 7-266139 | 10/1995 |
| JP | 2002-254250 | 9/2002 |

* cited by examiner

Primary Examiner—Geoffrey S. Evans
(74) Attorney, Agent, or Firm—Staas & Halsey LLP

(57) ABSTRACT

Set feed speed is lowered when a short circuit is detected in a range within which machining is unstable, the range starting from the point at which discharge is detected after machining starts from a machining start point, thus control is carried out according to a machining rate, thereby preventing successive occurrence of short circuits. When machining proceeds beyond the unstable range, the lowered feed speed is returned to the normal feed speed.

9 Claims, 9 Drawing Sheets